| (12) United States Patent | (10) Patent No.: US 12,041,064 B2 |
|---|---|
| Shabtai et al. | (45) Date of Patent: Jul. 16, 2024 |

(54) METHOD AND SYSTEM FOR CLASSIFYING DATA OBJECTS BASED ON THEIR NETWORK FOOTPRINT

(71) Applicant: Intelici—Cyber Defense System LTD., Moshav Herut (IL)

(72) Inventors: Asaf Shabtai, Kibbutz Hulda (IL); Dror Levy, Shoham (IL); Elad Israeli, Moshav Herut (IL); Rami Puzis, Ashdod (IL)

(73) Assignee: INTELICI-CYBER DEFENSE SYSTEM LTD., Moshav Herut (IL)

( * ) Notice: Subject to any disclaimer, the term of this patent is extended or adjusted under 35 U.S.C. 154(b) by 836 days.

(21) Appl. No.: 16/980,618

(22) PCT Filed: Mar. 14, 2019

(86) PCT No.: PCT/IL2019/050286
§ 371 (c)(1),
(2) Date: Sep. 14, 2020

(87) PCT Pub. No.: WO2019/175880
PCT Pub. Date: Sep. 19, 2019

(65) Prior Publication Data
US 2021/0021616 A1 Jan. 21, 2021

Related U.S. Application Data

(60) Provisional application No. 62/642,817, filed on Mar. 14, 2018.

(51) Int. Cl.
*H04L 9/40* (2022.01)
*H04L 41/14* (2022.01)
(Continued)

(52) U.S. Cl.
CPC .......... *H04L 63/1408* (2013.01); *H04L 41/14* (2013.01); *H04L 43/028* (2013.01);
(Continued)

(58) Field of Classification Search
CPC ... H04L 63/1408; H04L 41/14; H04L 43/028; H04L 43/062; H04L 63/1416; H04L 63/1425; G06F 18/22
(Continued)

(56) References Cited

U.S. PATENT DOCUMENTS 8,682,812 B1 3/2014 Ranjan
9,432,389 B1 * 8/2016 Khalid ............... H04L 63/1425
(Continued)

FOREIGN PATENT DOCUMENTS

CN 1728642 A * 2/2006
CN 102945372 B * 6/2015
(Continued)

OTHER PUBLICATIONS

Bocchi et al; "MAGMA network behavior classifier for malware traffic" Computer Networks 109 pp. 142-156 (2016).
(Continued)

*Primary Examiner* — Haresh N Patel
(74) *Attorney, Agent, or Firm* — BROWDY AND NEIMARK, P.L.L.C.

(57) ABSTRACT

The present invention provides a method for determining a type of an object distributed through communication network said method implemented by one or more processing devices operatively coupled to a non-transitory storage device, on which are stored modules of instruction code that when executed cause the one or more processing devices to perform: monitoring objects traffic through communication network; building the objects' footprint, wherein said footprint is inferred from monitored traffic flows that contain
(Continued)

said object wherein the footprint is organized in a graph structure wherein nodes are source and target network addresses of said traffic flows two nodes are connected if there is a traffic flows between the network address of the respective nodes containing the said object, analyzing the objects footprint for identifying features characteristics/parameters of the footprint to determine the objects type.

19 Claims, 9 Drawing Sheets

(51) Int. Cl.
| | |
|---|---|
| *H04L 41/16* | (2022.01) |
| *H04L 43/028* | (2022.01) |
| *H04L 43/062* | (2022.01) |
| *G06F 18/22* | (2023.01) |
| *G06N 20/00* | (2019.01) |

(52) U.S. Cl.
CPC ........ *H04L 43/062* (2013.01); *H04L 63/1416* (2013.01); *H04L 63/1425* (2013.01); *G06F 18/22* (2023.01); *G06N 20/00* (2019.01)

(58) Field of Classification Search
USPC .......................................................... 726/23
See application file for complete search history.

(56) References Cited

U.S. PATENT DOCUMENTS

| | | | |
|---|---|---|---|
| 10,089,383 B1* | 10/2018 | Mackay | G06N 7/00 |
| 10,608,931 B1* | 3/2020 | Kumar | H04L 12/4641 |
| 10,686,792 B1* | 6/2020 | Keefer | H04L 67/53 |
| 2006/0173992 A1 | 8/2006 | Weber et al. | |
| 2009/0222446 A1* | 9/2009 | Goldschmidt | G06V 10/42 |
| 2012/0311564 A1* | 12/2012 | Khalid | H04L 67/1097 |
| | | | 718/1 |
| 2016/0342862 A1* | 11/2016 | Liu | G06T 15/04 |
| 2017/0279694 A1 | 9/2017 | Sartran et al. | |
| 2017/0279833 A1 | 9/2017 | Vasseur et al. | |
| 2018/0145886 A1* | 5/2018 | Rao | H04L 41/22 |
| 2019/0258804 A1* | 8/2019 | Glenn | H04L 63/1433 |
| 2019/0260547 A1* | 8/2019 | Nammi | H04L 5/0058 |

FOREIGN PATENT DOCUMENTS

| | | | | |
|---|---|---|---|---|
| CN | 107451703 A | * | 12/2017 | ....... G06F 17/30867 |
| RU | 2670781 C2 | * | 10/2018 | ............ G06F 15/00 |
| WO | WO-2017221246 A1 | * | 12/2017 | ........... B07C 5/3412 |

OTHER PUBLICATIONS

Bocchi et al; "Network Connectivity Graph for Malicious Traffic Dissection" Conference: 2015 24th International Conference on Computer Communication and Networks, p. 1.

* cited by examiner

METHOD AND SYSTEM FOR CLASSIFYING DATA OBJECTS BASED ON THEIR NETWORK FOOTPRINT

BACKGROUND

Field of the Invention

The present invention relates to the field of detecting new cyber threat by analyzing Objects propagation in ISP traffic using machine learning techniques. Using these techniques enables to detect unknown threats at early stage of the threat lifecycle and thus improve detection time and protect business, private networks, mobile customers, IOT networks, connected cars and more.

Description of the Related Art

The need:
  The number of new attacks is growing every day. The time required to generate signatures for new attacks varies between days to months due to the enormous numbers of new attacks.
  Private sector is less protected and thus is the incubator for most cyber-attacks.
  The Cyber Security solutions in the market are failing to adjust to the growing cyber threat. The traditional approaches, such as customer side protection with static and dynamic analysis and anomaly detection are not sufficient for handling today's new threats which spawn in those regions of the Internet where costly cyber protection is not appreciated.
  The fundamental limitation of anomaly based malware detection approach is its high false alarm rate. And specification-based detection often has difficulty to specify completely and accurately the entire set of valid behaviors a malware should exhibit.
  Recently more and more products are using machine learning techniques to improve the ability and add new capabilities to the existing rule engine technology
  In order to overcome these issues, Intelici proposes a new approach for malware analysis and detection that consist of the below stages.

1. Network Embedding

Networks (also known as graphs) consist of primitive compounds called vertices and links between vertices which represent their interactions, similarities, or distances of sorts. Networks are widely used for the analysis of complex processes in various fields like biology, sociology, engineering, etc. The topology of a network often encompasses important information on the functionality and dynamics of the system or the phenomenon it represents. As case in point, structural similarity of road networks and fungal networks are the result of low cost and robustness being the main driving forces in the network development [1].

Techniques for embedding networks into a multi-dimensional vector space [5,6], enable the application of relational data mining techniques to network data. Vector representations of networks can be found using feature extraction, graph kernels, neural networks, and other methods. Next we review methods for embedding, comparison, and classification of graphs.

1.1. Features and Local Structures

Embedding networks in a multi-dimensional vector space enables the application of variety of statistical analysis tools, available today, to datasets containing thousands of large-scale networks. Let $G=(V, E) \in \Gamma$ be a graph (a.k.a. network) where V is the set of vertices, E is the set of edges, and $\Gamma$ is the set of all possible graphs. Let $f: \Gamma \to \mathbb{R}^k$ be an embedding function that, maps a graph to a k-dimensional vector of real numbers. Devising f is the crucial part in network classification. In the following discussion we review features extracted from network topologies at multiple scales for the purpose of network embedding.

Global features. Over the years, many features (such as density, average path length, diameter, and clustering coefficient etc.) have been suggested to characterize topologies of complex networks [2,7]. The clustering coefficient is considered to be a good distinguisher between networks of different types [8,9]. Given a vector of global features one can use any vector similarity measure, e.g. Euclidean distance, cosine similarity etc., to define similarity among graphs.

Embedding networks in a vector space by means of global features is straightforward. However, there are three common deficiencies in such methods: (1) Each one of these features is meant to capture a specific aspect of the network structure and, therefore, should be picked up manually by domain experts taking into account a specific application, in our case classification of objects contained in the communication traffic to malicious or benign based on their footprint in the traffic. These features are limited in nature and cannot be claimed to cover all, or even most, of the network structure aspects. This patent considers all global features that exist in literature as well as their future derivations as possible compounds of the possible embodiments of this patent. (2) Global features usually span different numeric ranges and need to be normalised. But the normalisation methods affect the distance metric and may distort the results. (3) Computation of some of the global features does not scale well.

Vertex/link features. Many structural properties were defined in the past to quantify the importance of vertices and to describe their location within the network: degree, closeness, betweenness, PageRank, and structural properties such as local clustering coefficient, hop-plot, etc. [2]. Topological properties can be defined for links as well, namely number of common neighbours, the Jaccard coefficient, Katz measure, Friends measure, and Adamic/Adar etc. [10,11,12]. Many link features can be generated by combining the vertex features of both its ends. An example of such combination is the preferential attachment score, defined as the product of the degrees of two vertices $$\text{preferential\_Attachment}(u, v) = \text{Deg}(v) \cdot \text{Deg}(u).$$

Any local feature can be further aggregated to produce a single value that describes the network as a whole. The most common aggregation functions include max, min, sum, average, variance, skewness, kurtosis etc. Any aggregation of a local feature along the set of vertices or links or a part thereof is a global feature. The most known global feature composed of an aggregation of a local feature is the average connectivity degree of vertices in the network. Berlingerio et al. [13] utilize aggregations of seven local features to produce uniform feature vectors that describe networks. They use median and four moments of the distributions of each feature as aggregators. While this method enables the generation of many non-trivial network features, the basic features still need to be defined by an expert.

Feature engineering is a tedious task that requires domain knowledge in order to construct meaningful features. Even with feature generation techniques that recombine or aggregate topological features at various levels, there is no consensus on what is the best set of features for network comparison and classification. Moreover, the different types of networks are best modelled with different sets of features. So far, no research has introduced a covering set of global features.

Aliakbary et al. [14] confirm that no ultimate set of network features exists. They utilize a variety of local and global network features to learn the importance of features. A genetic algorithm is employed to find the optimal weights of the features within three base distance functions (Euclidian distance, Manhattan distance, and Canberra distance) based on a dataset of multiple real and artificial networks. The quality of the weights was evaluated based on the distance between (1) networks generated by the same random model, (2) real networks from the same type (e.g. social, communication, protein interaction, etc.), and (3) snapshots of the same network over time.

Local structures. Some of vertex/link features are affected only by the network topology in the vicinity of the vertex/ link. Recent works advance towards producing a covering set of locally constrained features. Shrivastava and Li [6] account for all paths (up to a limited length) while producing graph invariants. Graphlets [15] enumerate all possible connected subgraphs of 2-5 vertices; 73 unique positions within the graphlets enumerate all possible constellations a vertex can participate in within its locality.

In order to produce network features, Yaveroglu et al. [15] an employ aggregation strategy which is very different from the commonly used versions of the four moments of the data (e.g. [16]). Every vertex v may touch an orbit i multiple times, each time with different vertices participating in a graphlet. Orbits are not independent. For example, a vertex participating many times in orbit 7 (the middle of a 4-vertex star) will also have a high value for orbit 2 (the middle of a 3-vertex path). Yet the correlation between two orbits across all vertices is a property that describes the network as a whole—more specifically—it describes prevalence of specific local structures. Kuramochi and Karypis [17] suggest a method for mining frequent patterns within a network which are also called motifs [18]. Motifs characterize the network and suggest its basic building blocks.

Both graphlets and motifs have two important drawbacks: they are locally constrained and represent unlabelled and unweighted structural patterns. This former drawback is especially apparent when looking at multiplex networks [19,20]. Links in different layers of a multiplex network are formed by different processes [21]. An example in a social network might be professional connections in LinkedIn vs. high school acquaintance; or in biological networks, correlations between metabolite quantities across samples vs. hyperlinks defined by metabolic pathways. In both cases, small connected subgraphs in one layer may project into a set of disconnected vertices in the other. But small connected subgraphs such as graphlets or motifs do not capture relationships between communities or relationships between distant vertices.

The problem of predicting the existence of hidden links or the creation of new ones in social networks is commonly referred to as the Link Prediction problem. A link prediction query consists of a (sometimes ordered) pair of vertices. Successful link prediction models in regular (dyadic) networks capture the link formation mechanism and are tightly related to the local topological features of the network. In [10], a range of features was evaluated that are used to predict links in social networks. The results showed that some features are more indicative to links in Flixter, The-Marker, or YouTube networks, while others better predict the existence/absence of links in DBLP or Facebook. There are a number of reasons for such differences. For example, most Facebook profiles evolve by adding connections to friends of friends and more distant profiles.

This result was leveraged in [22] to develop features for describing networks. These features were derived from the quality of link prediction heuristics. Given a network G=(V, E), we sample randomly k pairs of vertices in V such that k/2 pairs of vertices are linked, and k/2 pairs are not linked. Then we extract link prediction features listed in [10] and perform feature selection based on the InfoGain ratio. The target class is Positive if a link between the two vertices exists, and Negative in case it does not. InfoGain expresses how well a feature distinguishes between Positive and Negative pairs of vertices. Each one of the networks was represented by the InfoGain values of various features used for link prediction. Standard supervised machine learning algorithms were successfully used to classify networks based on the vectors of InfoGain values. These results suggest that trained Link Prediction models can be used to represent networks and collections of networks, however, these results were not leveraged for network classification on large scales.

1.2. Graph Kernels

Here, we briefly discuss graph kernels as a means for network embedding or classification. A graph kernel is a function $f(G_1, G_2) \in R$ that returns a real number given a pair of graphs. Let $G_1=(V_1, E_1)$ and $G_2=(V_2, E_2)$ be two graphs. A trivial example of a graph kernel is $mul(G_1, G_2)=|V_1|\cdot|V_2|$. Other graph kernels can quantify the difference or similarity between the two graphs. Graph kernels must be symmetric, $f(G_1, G_2)=f(G_2, G_1)$ for all $G_1, G_2$, and be positive semi-definite. Graph kernels can be used for embedding graphs in a k dimensional space by selecting a set of k prototype networks and computing kernel values of the given network and each one of the prototypes: $\mathbb{R}^k \in f(G)=[f(G_1, G_2), \ldots, f(G, G_k)]$ [23].

Various methods can be used to define graph kernels. For example, Kashima et al. [24] employs random walks to generate a sequence of vertices and employ a sequence of kernels to compare between graphs. Other works use shortest paths [25] or trees [26] for the same purpose. Graph edit distance, global and local features, graphlets, and other techniques mentioned above can be formalized as graph kernels [27,28]. Graph kernels based on functionals proposed by Shrivastava and Li [29] are resilient to vertex permutations, an important property for neural networks based classification as will be apparent shortly.

Graph kernels can be defined also based on generative network models. There are generative network models that can generate networks similar to a given prototype by fitting a small set of parameters [8,30,31,32,]. Since, similar networks have similar models, the model parameters can be used as a representation of the network in a vector space. Similar to well-known probability distributions (e.g. exponential, binomial, etc.), probabilistic graph models can be best fitted to a particular type of data. For example, stochastic block models [30] realize well the community structure of a network while the Kroneker graphs model [8] best represents networks that exhibit the property of self-similarity.

There are a few approaches to use probabilistic network models, such as the Kroneker graphs, for graph embedding and classification. The Kroneker graphs model is based on the Kronecker power of matrices. Kroneker power of a matrix $M^{n\times n}$ is a matrix $M^{[2]}$ of dimensions $n^2 \times n^2$, such that every cell $M_{i,j,k,l}^{[2]} = M_{i,k} \cdot M_{j,l}$. Given some 2×2 initiator matrix I, the Kroneker power $I^{[k]}$ represents a probabilistic adjacency matrix of a graph with $2^k$ vertices. Given some network G, one can find the optimal $I_G$ such that the probability of randomly drawing the network G based on the probabilities in $I_G^{[k]}$ is maximized. Such a process is implemented in KronFit [8] and is optimized in KronEM [33]. KronFit can be considered as a variant of network embedding $f(G)=\text{vec}(I_G) \in \mathbb{R}^4$, where $\text{vec}(I_G)$ is a vectorised initiator matrix.

1.3. Neural Networks

Series of works employ neural networks to learn network representations and to perform network matching. The first neural models employed Hopfield networks for memorizing and comparing graph representations. The approach is described here based on [35]. A Hopfield network [36] is a recurrent neural network that consists of independent highly interconnected neurons. The output of each neuron is determined from an aggregation of its weighted inputs according to a sigmoid function $$g(u_i) = \frac{1}{1+e^{-u_i/T}}.$$

The network tries to minimize the overall output, mimicking an energy transfer. Link weights are updated according to the configuration parameter T until the network reaches local energy minima. By doing so, the network "remembers" its input and can reconstruct it later.

In [35], the authors organize the neurons in a Hopfield network as an m×n matrix, where m and n are the number of vertices in networks $G_1$ and $G_2$, respectively. Activation of a neuron $u_{i,j}$ means that the vertex $i \in V_1$ is mapped to the vertex $j \in V_2$. The energy function is modified, such that, cases with more than one active neuron for every row and column are penalised. This network matching process does not scale well. It works for pattern graphs of objects extracted from images, but cannot withstand the scale of large networks.

After a stagnation period, neural networks are again being used for analyzing networks. The main challenge in applying standard neural networks on graph data is the ordering of vertices/edges. Permuting vertices of a network does not change the network but changes its representation. DeepWalk [37] copes with this challenge by generating collections of short random walks. Each random walk is encoded as a vector of size n, where n is the number of vertices in the network. Every input is set to 1 if the vertex participates in the walk, and to 0 otherwise. This approach is reminiscent of deep learning methods applied to texts (i.e. Word2Vec [38]). Auto-encoder fed with many walks on the same network is supposed to learn the latent factors of the network representation.

Deep Graph Kernels [39] is an approach for building a graph kernel from latent representations of networks. In this approach, neural network inputs correspond to graphlets found within the input network. Intuitively, this approach differs from finding the common subgraphs (motifs) the same way that Word2Vec differs from simpler bag-of-words approaches. This approach also does not suffer from the vertex ordering problem mentioned above. In order to deal with the complexity of graphlet enumeration in large networks, the authors sample graphlets by randomly placing windows of size k×k (a.k.a. the receptive field) on the adjacency matrix and enumerating graphlets within the windows.

Niepert et al. have recently suggested a learning algorithm that generates meaningful features directly from network data and is able to learn from a collection of networks [41]. The proposed solution is based on convolutional neural networks (CNNs). The receptive field (a.k.a. sliding window in image processing or shape of the convolution kernel) in this case is a vector of vertices used as an input. The receptive field moves throughout the network, each time focusing on a different vertex. The focus vertex is set to be the first input in the receptive field. Neighbours of the focus vertex occupy the following positions in the input vector, then neighbours of the neighbours, and so forth. If the receptive field is small, only the first vertices are considered. If the receptive field is larger than the number of vertices in the network, then the tail is padded with zeroes up to the maximal length of the receptive field. This technique partially solves the vertex ordering issues in graphs by imposing partial order on the vertices. Yet the authors acknowledge that normalisation, i.e. appropriate indexing of vertices in the receptive field is a challenge and try solving it using a canonical labelling approach [42]. The approach is compared to several graph kernels used in the past, and was shown to classify networks better on most of the benchmark datasets.

The primary difficulties that hinder application of CNNs to subgraph classification are: (1) receptive fields contain a sequence of successive vertices according to the canonical labelling, while indicative patterns may be dispersed; (2) large receptive fields increase the computational effort of the approach, but small receptive fields will not capture global network properties such as the community structure; (3) the approaches described above cannot be trivially extended to classification of subgraphs in the context of larger networks.

SUMMARY

Our main objective in creating this new malware detection technology is to improve malware detection capabilities, reduce detection time, improve protection, and reduce infection for non-professional sectors.

We compute digital representation of a particular software object based on the traces of said object in the Internet traffic as observed by an ISP (or collection of ISPs), hereafter referred to as footprint. Unlike all state-of-the-art solutions the digital representation is not inferred from the content of the traffic flows but rather from the source-destination network induced from the mere existence of the flows. Footprint may include additional properties of nodes (IP address ranges) or links (traffic flows).

Machine learning is employed to generalize from footprints of a sample of known objects of various classes (e.g. malicious, legitimate) and create a classification model which is able to determine the class (e.g. malicious, legitimate) of an object given its footprint.

- The machine learning generalization ability is highly important to identify previously unknown malware spread based on common patterns of its footprint.
- It utilizes highly important unique source of information—Network Footprint—in addition to standard traffic classification methods.
- The carrier-level data we extracted will allow us to follow the malware spread in the network.

Early Identification of new malwares by their footprint is a huge advantage and it may shorten the detection time compared to COTS products.

The present invention provides a method for determining a type of an object distributed through communication network said method implemented by one or more processing devices operatively coupled to a non-transitory storage device, on which are stored modules of instruction code that when executed cause the one or more processing devices to perform:

monitoring objects traffic through communication network;

building the objects' footprint, wherein said footprint is inferred from monitored traffic flows that contain said object wherein the footprint is organized in a graph structure wherein nodes are source and target network addresses of said traffic flows two nodes are connected if there is a traffic flows between the network address of the respective nodes containing the said object.

analyzing the object's footprint for identifying features characteristics/parameters of the footprint to determine the object's type.

According to some embodiments of the present invention the types of objects include malicious and legitimate/benign.

According to some embodiments of the present invention the object identity is determined by a signature, wherein the signature is generated from the digital properties of the object.

According to some embodiments of the present invention footprint graph is enriched with additional information of data related to object communication environment or characteristic.

According to some embodiments of the present invention the footprint contains additional enrichment information about the nodes (sources/targets) of traffic flows.

According to some embodiments of the present invention the footprint analysis includes transforming footprints into numeric vectors, building a classifier ML model for discriminating between types of objects based on said numeric vectors, using the said classifier to determine type of an object based on said numeric vectors.

According to some embodiments of the present invention the analysis includes determining similarity score between objects by comparing their footprints features determining the type of an object from its similarity to other objects.

According to some embodiments of the present invention the method further comprising the step of identifying object based on object signature by comparing to database of known objects signatures.

According to some embodiments of the present invention the new object which were not identified are tagged based on external security analysis of object.

According to some embodiments of the present invention the method further the step of filtering the monitored objects based on ongoing filtering rules determined based on analyzing internal and external data related to said objects.

The present invention the system for determining a type of an object distributed through communication network, said system comprising a non-transitory storage device and one or more processing devices operatively coupled to the storage device on which are stored modules of instruction code executable by the one or more processors:

Taping module monitoring objects traffic through communication network;

Footprint update module for building the objects' footprint, wherein said footprint is inferred from monitoring traffic flows that contain said object;

wherein the footprint is organized in a graph structure wherein nodes are source and target network addresses of said traffic flows two nodes are connected if there is a traffic flows between the network address of the respective nodes containing the said object.

Detection module for analyzing the object's footprint for identifying feature/characteristics/parameters of the footprint to determine the object's type.

According to some embodiments of the present invention the detection module is implemented at an ISP provider infrastructure.

According to some embodiments of the present invention types of objects include malicious and legitimate/benign.

According to some embodiments of the present invention the object identity is determined by a signature, wherein the signature is generated from the digital properties of the object.

According to some embodiments of the present invention the footprint graph is enriched with additional information of data related to object communication environment or characteristic.

According to some embodiments of the present invention footprint contains additional enrichment information about the nodes (sources/targets) of traffic flows.

According to some embodiments of the present invention the footprint analysis includes transforming footprints into numeric vectors, building a classifier ML model for discriminating between types of objects based on said numeric vectors, using the said classifier to determine type of an object based on said numeric vectors.

According to some embodiments of the present invention the analysis includes determining similarity score between objects by comparing their footprints features, determining the type of an object from its similarity to other objects.

According to some embodiments of the present invention the system further comprising matching module for identifying object based on object signature by comparing to database of known objects signatures According to some embodiments of the present invention the new object which were not identified are tagged based on external security analysis of object According to some embodiments of the present invention further filtering module for filtering the monitored objects based on ongoing filtering rules determined based on analyzing internal and external data related to said objects.

DETAILED DESCRIPTION

Figure 1A:
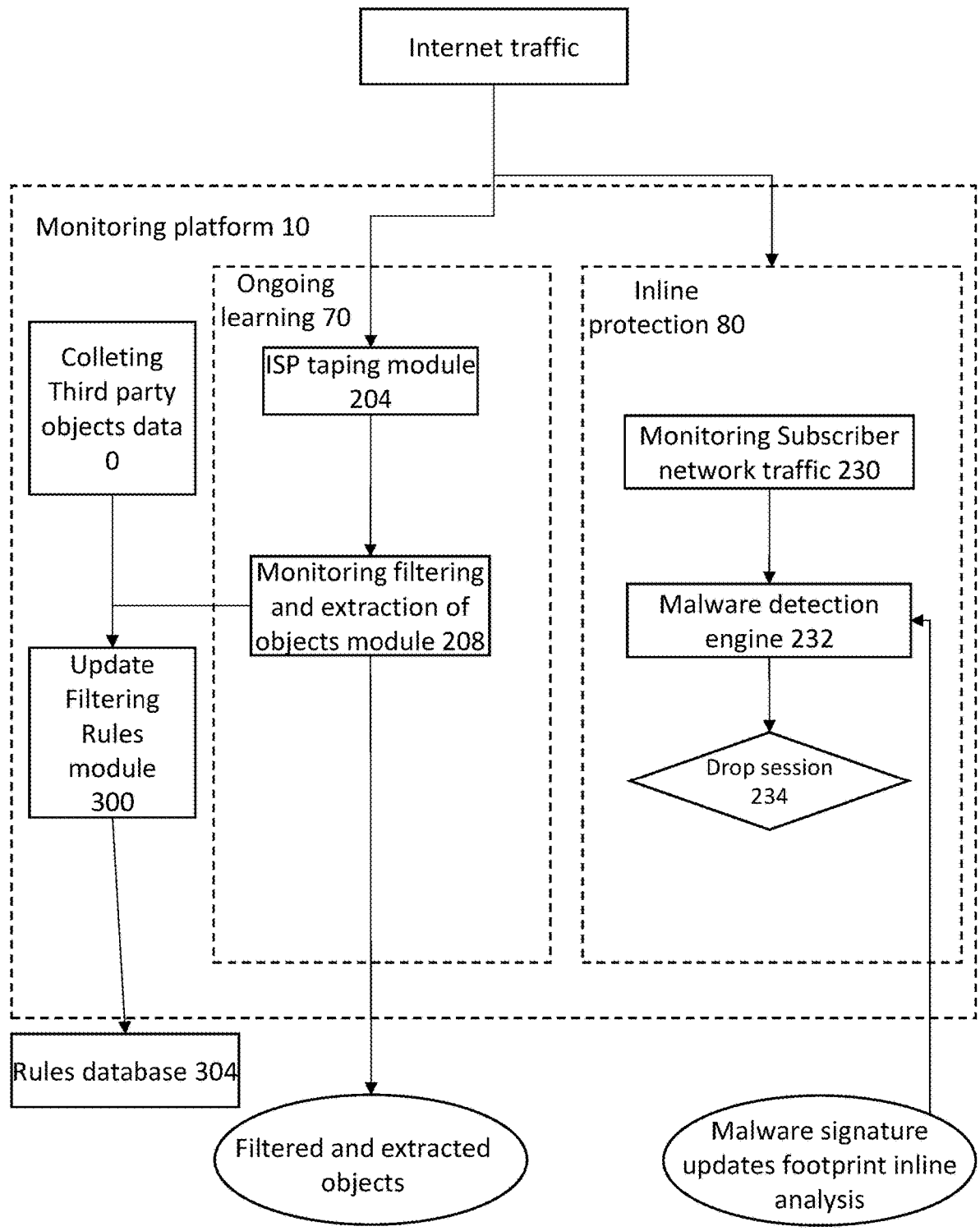
FIGS. 1A and 1B illustrate an architecture of the system according to some embodiments of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Definitions

The term "Object" as referred in the present invention—may include any digital piece of information or software that can be replicated, stored on magnetic, optical or electronic storage, and transmitted through a communication network. Examples: an image in jpg format, an executable binary file, an HTTP request, Java scripts, and etc.

The term "Known object" as referred in the present invention define an object which was identified by common security vendors either as malicious or known to be benign.

The term "Unknown object" as referred in the present invention defines an object whose classification as malicious or benign was not determined yet. The object may remain unknown for a long while. This may happen for example in case the Object is not prevalent enough or not important enough to be analyzed by major security vendors.

The term "New object" as referred in the present invention define an unknown Object that is available in the Internet traffic for a short while. For example, a zero day exploit or a newly generated pdf file.

The term "Signature" as referred in the present invention define—a sequence of bytes, a regular expression or a set of rules that uniquely identify particular Object.

The term "Footprint" as referred in the present invention define—the traces of particular Object in the Internet traffic.

The term "Object class" as referred in the present invention define—is the label assigned to an object by Intelici or other security vendors. The classification can malicious or benign with respective subclasses that identify the types of attacks.

The term "Classification" as referred in the present invention define—a process of assigning a class to an object.

The term "Identification" as referred in the present invention define—a process of searching for objects of specific class (usually various types of malicious objects) in a large pool of data.

The present invention technology is based on a unique representation and analysis of digital objects (files, scripts, URL, posts, tweet, and any other digital content that can carry malicious or disturbing content) traffic over the web from an ISP perspective. The unique representation, referred to as footprint, is derived from the tracing the traffic of the said digital objects within the network.

Unlike state-of-the-art solutions the unique footprint representation of a digital object is not inferred from the content of the object seen in the traffic flows, but rather from the source-destination network induced from the mere existence of the object within the flows.

The footprint of an object according to the present invention is a digital representation which encapsulates the object's appearances/occurrences in communication flows of the inspected Internet traffic. Building the footprint of an object is a continuous process in which the footprint can be updated when new instances of the specific object are observed within the traffic. The representation of the object footprint is a graph; the nodes of the graph are IP addresses from which the object was transmitted and the links indicate a flow from one node (IP address) to another which contains the object. Both nodes and links can be enriched with additional information, for example, the number of times the object was sent from one node to another, how often these nodes are communicating, type of IP address (gateway, private, home, organization) and etc.

According to some embodiments of the present invention the objects are news content and the footprint represent the news object propagation through internet traffic or social network or social messaging platforms. The object type may relate to the content of the object, determining if the news content is fake or non-fake news.

From this graph (which as mentioned can be continuously updated as more observations are available) different types of features are extracted in order to create the vector representation of the object, i.e., footprint. Exampled of such features can be found in the background section, including global features such as density, average path length, diameter, and clustering coefficient etc., or location of vertex within the network, such as degree, closeness, betweenness, PageRank, and structural properties such as local clustering coefficient, hop-plot, etc.

The proposed system operates in two (parallel) modes: train (executing machine learning algorithms for deriving the detection models) and classification (applying the models on unknown objects for classifying these objects as malicious or benign).

FIG. 1: An architecture of the system that represents one embodiment of the present invention. The system may be deployed at the premises of multiple ISPs.

The system is comprised of: monitoring platform 10 and inline protection platform 90. The monitoring platform 10 is comprised of ongoing learning subsystem 70 for tracking object footprint during learning phase and inline protection monitoring subsystem 80 for continuous tracing of object and identifying malware.

The online ongoing subsystem 70 is comprised of:
network Tap (204) for monitoring received ISP traffic optionally at Layer7;
filtering and extraction of Objects Module, 208 for filtering objects based on predefined rules uploaded from database 304, including session reconstruction and object hash and flow record extraction.

The rule database 304 is updated by the update filtering module 300 which determines the filtering rules based on object's collected data form third party including at least one of: object types distribution, identified vulnerability, objects related to new exploit, risk assessment, object occurrence, objects of specific customers, specific list of unknown objects (signatures).

The inline protection monitoring subsystem 80 is comprised of: Subscribers network traffic module (230) for monitoring traffic of subscribed user, Malware detection engine 232 for malware detection base on extracted signatures of the objects (based on Footprint data using the trained ML model) and Drop Session module 234 for blocking malware based on the results of the malware detection engine.

The In line protection analysis learning platform 90 is comprised of:

Object matching and identification module 210 for tagging/labeling objects based on known malware database.

Object footprint updating enrichment and extraction module 216 with new flow base hash matching including propagation graphs, the enrichment includes adding the footprint graph with available information on nodes and links (216).

Model generator for Training ML model (machine learning model) (222) for known malware objects Malicious footprint detector 224 for unknown objects base on the generated/trained ML model (224), Signature generator and update module 226 for unknown object detected as malicious. The update module transmits the new Signature to the inline system protection subsystem 90, optionally located at ISP (226)

Figure 1B:
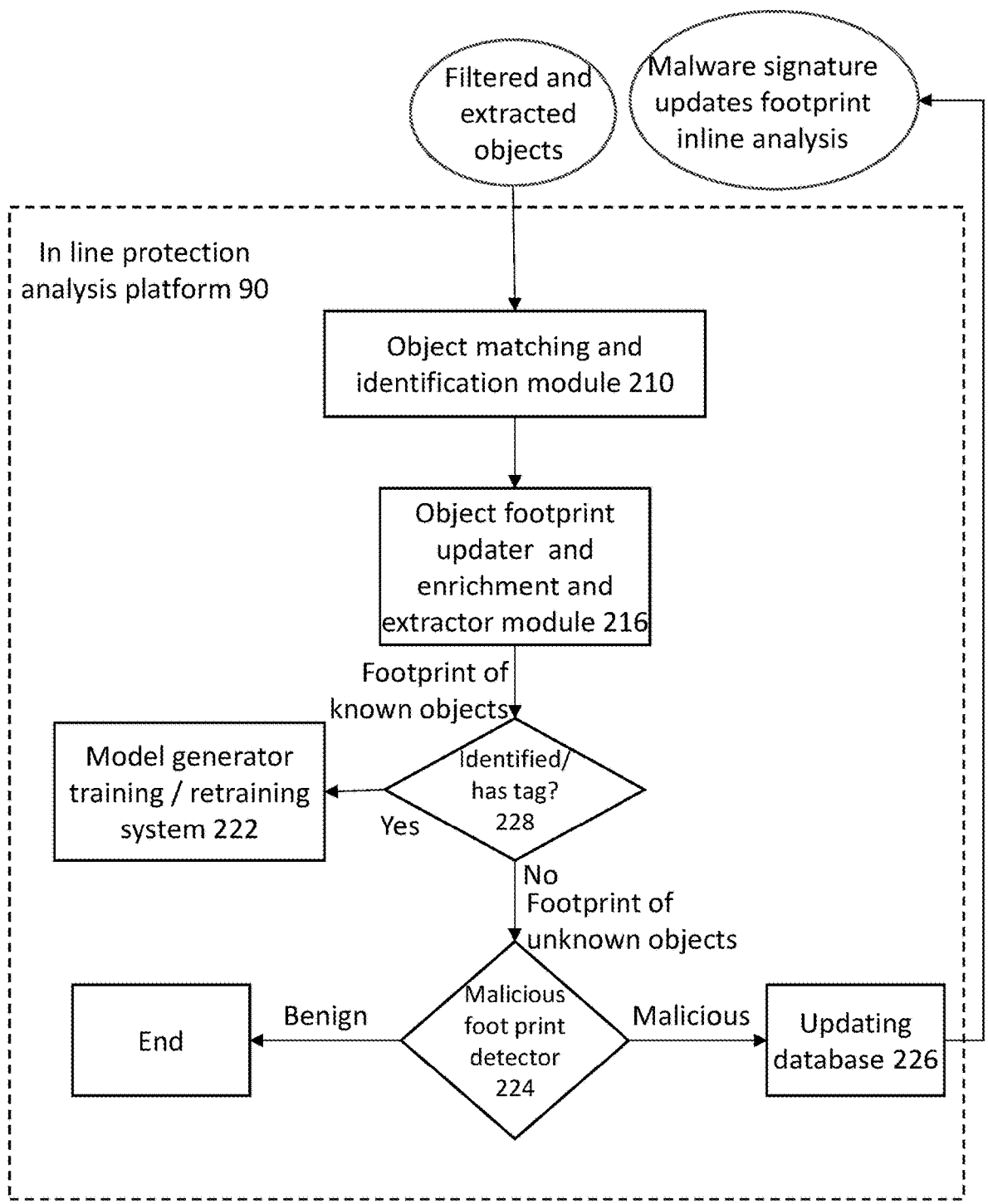
Figure 2A:
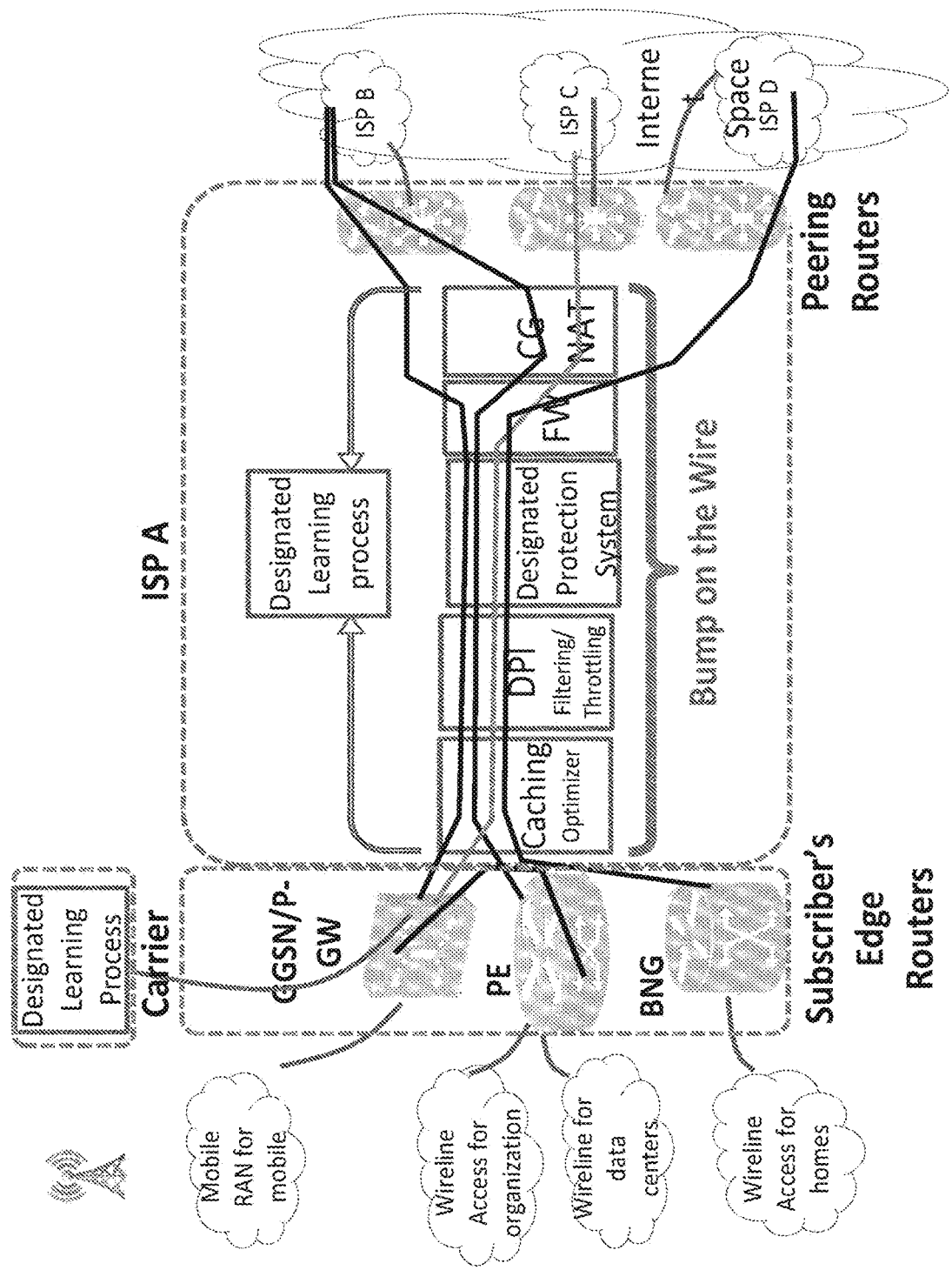
FIG. 2A: illustrates an integration and positioning of the present invention protection in ISP network topology, according to some embodiments of the present invention.

FIG. 2A: illustrates an integration and positioning of the designated protection systems according the present invention in ISP network topology, the designated protection system is integrated at two major components that are located at ISP level, The first component For Learning is tapping on the subscriber communication line and at a by path within the ISP communication infrastructure purpose as describe in FIG. 1 and includes the listed modules (204), (208), (208), (210), (216), (218), (220), (222), (224). (226) and the second Component is the Inline protection system seen in FIG. 1 system blocks and protect against Cyber Threats as describe in FIG. 1 for modules (232)-(234) for diverted subscriber traffic.

Figure 2B:
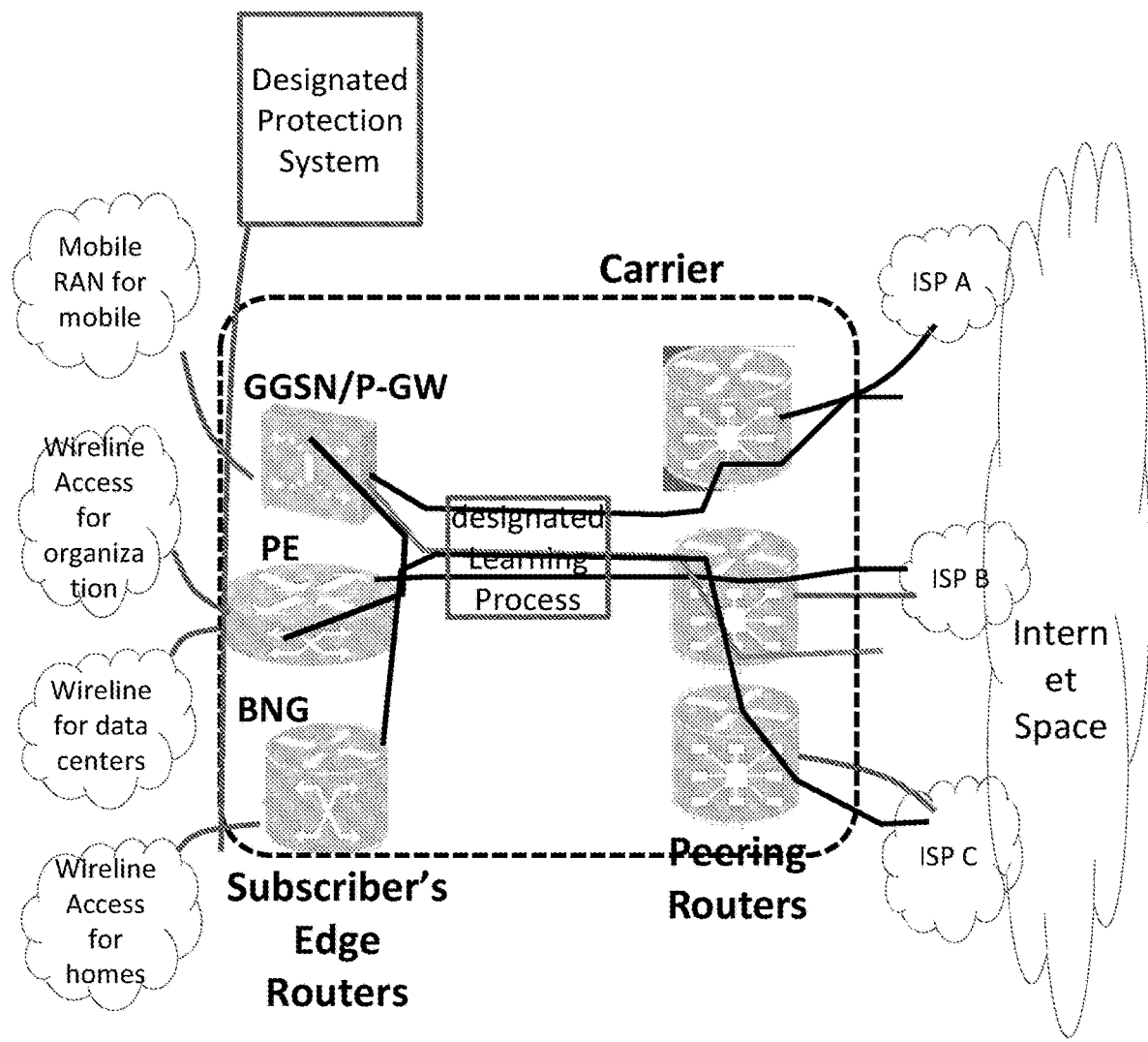
FIG. 2B: illustrates an integration and positioning of the present invention protection in carrier network topology, according to some embodiments of the present invention.

FIG. 2B: illustrates an integration and positioning of the designated protection systems according the present invention in carrier network topology, the designated protection system is integrated at two major components that are located at ISP level. The first component for learning purpose is located in between the Subscriber's Edge Routers and peering router (this component as describe in FIG. 1 and includes the listed modules (204), (208), (208), (210), (216), (218), (220), (222), (224). (226) and the second component is the Inline protection is tapping on all the relevant communication links of the subscriber: wired communication or wireless communication. The component is seen in FIGS. 1A,B system blocks and protect against cyber threats as describe in FIG. 1 for modules (232)-(234) for diverted subscriber traffic.

FIGS. 3, 4, 5, 6, 7, and 8: present the overall process of monitoring traffic, training detection ML models, and detecting new malicious objects.

Figure 3:
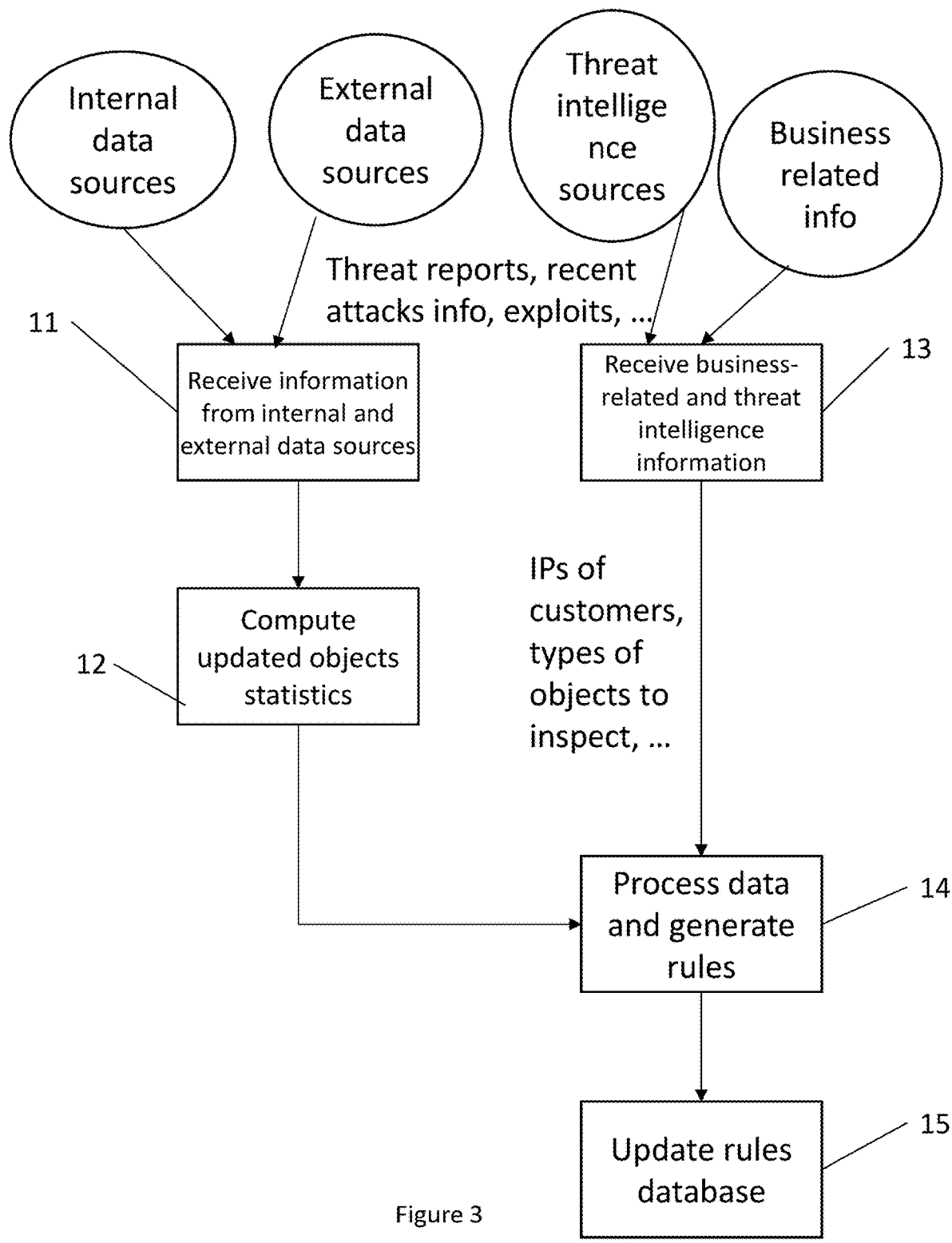
FIG. 3: illustrates a flowchart that represents the process of updating filtering rules, according to some embodiments of the present invention.
Figure 4:
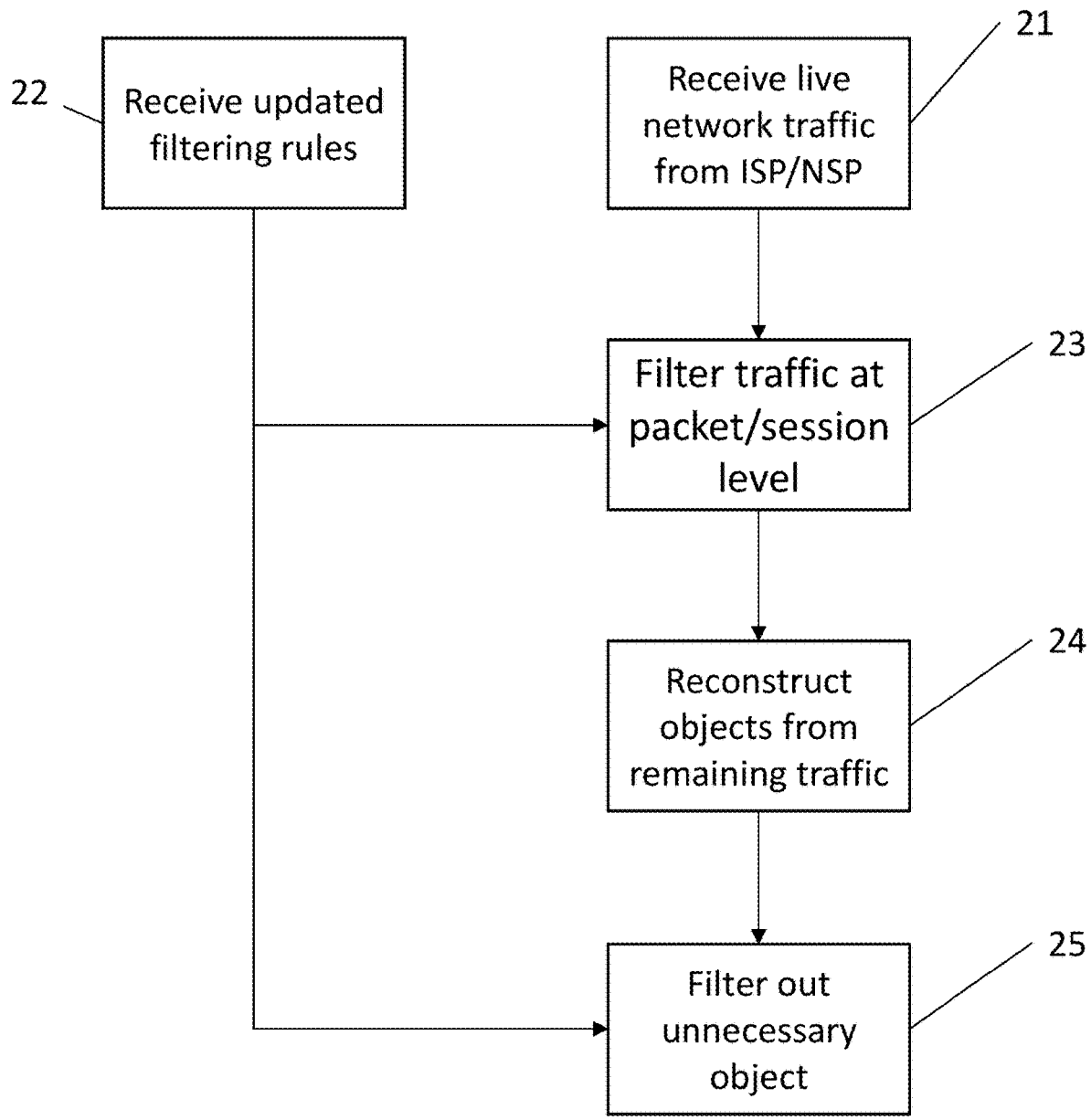
FIG. 4: illustrates a flowchart that represents the process of extracting Objects from network traffic, according to some embodiments of the present invention.
Figure 8:
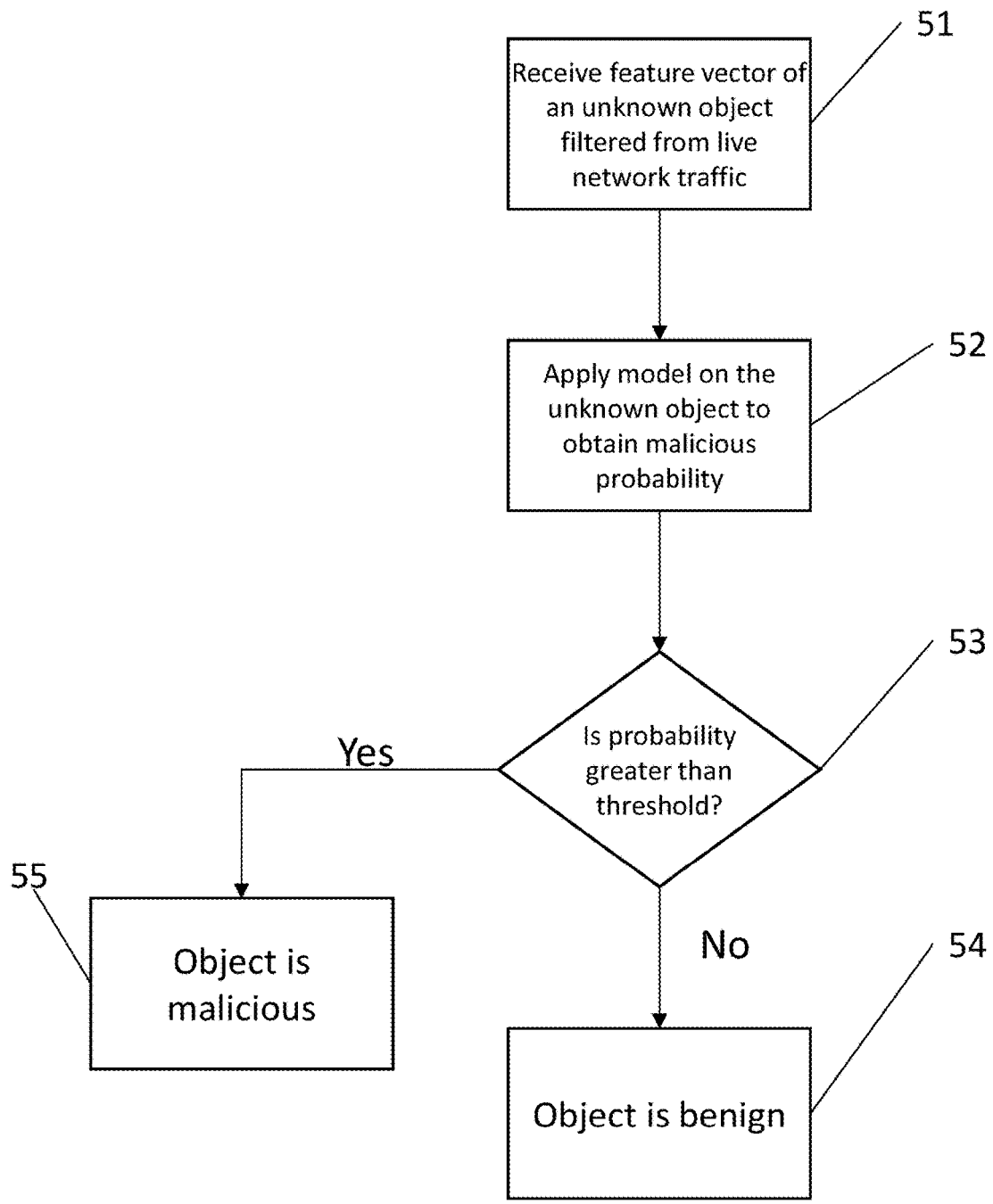
FIG. 8: illustrates a flowchart that describes the process of classifying an unknown Object, according to some embodiments of the present invention.

FIG. 3 illustrates the process of defining/updating filtering rules, FIG. 4 illustrates the process of extracting relevant objects from live network traffic. Then, in FIG. 5 (see module 236 FIG. 1B) the process of maintaining, updating, enriching and extracting an object's footprint is presented. In FIG. 8 (see module 222 FIG. 1B) illustrates the process of training the detection ML model, evaluating its performance, and determining the ML model's optimal parameters such as the threshold. Finally, in FIG. 8 (see Figure module 224 in FIG. 1B) illustrates the process of classifying an unknown object based on the trained ML model.

FIG. 3: A flowchart that illustrates the process of update filtering rules according to some embodiments of the present invention. It starts with receiving information from internal and external data sources (e.g., types and distribution of observed objects) (11) in order to compute statistics of object types (12) appearances in communication traffic. In addition, these modules use business related information (e.g., IP addresses of customers, list of Object types of customer) as well as threat intelligence information (new exploits or vulnerabilities, emerging threats) (13), which is received from third party services. This information is being processed in order to generate new rules for the filtering module (14). Finally, the derived rules are updated in the active rules database and are applied on the real traffic (15).

The filtering module enables handling the large amount of objects, providing an intelligent filtering, i.e., selection of monitored object types is applied. This module may dynamically update the rules which are enforces by the network traffic monitoring components based on the current understanding of the threat landscape and processing capacity.

According to some embodiments of the present invention, the object filtering module filtering rules may be derived by weighting the following information:

Object types distribution: the probability of an unknown file/object to be monitored will be set according to the distribution of object type (e.g., pdf file, exe) recently observed at the ISP/NSP. A change in the distribution may also trigger an updating of the filtering rules, for example, when the probability was decreased dramatically.

Identified vulnerability: if a critical vulnerability is detected for a specific platform (e.g., a vulnerability in a specific pdf reader that allows code execution) we will monitor the relevant objects (e.g., pdf files).

Objects related to new exploit: select and monitor files/objects that are linked with a specific exploit that was recently observed. For example, given a signature of a remote code execution exploit, we could identify the files (potentially Trojans or bots) that are downloaded after the remote code or appeared in the same flows execution and monitor them.

Risk assessment: the probability an unknown file/object to be monitored will be set according to an updated risk assessment process which takes into account the recent trends of emerging threats (e.g., an increasing number of attacks through video streams, or Trojan Android applications such as malicious Skype).

Object occurrence: focusing on files/objects that appears more than x times in the ISP/NSP infrastructure; or alternatively, isolated/unique files that are sent to specific targets (e.g., organizations) thus might be part of a targeted attack.

Objects of specific customers: monitoring and classifying objects/files sent to or from specific customers/organizations.

Specific list of unknown objects (signatures): collecting footprint and classifying specific list of objects provided by an external or internal source. In this case a list of signatures of the unknown objects will be provided.

Other rules: Additional expert-based rules such as all objects originated from Russia, China, IP ranges . . . .

FIG. 4 (see module 208 in FIG. 1A): A flowchart that illustrates the process of extracting Objects from network traffic. Live network traffic is collected from the network (21). First, based on the filtering rules that are defined at a flow level (22), packets or sessions are filtered out (23) (e.g., filter our traffic from specific IP addresses). From the remaining traffic, objects are reconstructed (24) (i.e., application layer). Finally, based on the filtering rules that are defined at an object level (22), unnecessary objects are filtered out (25).

The Monitoring and Extraction of Objects Module receives as an input live network traffic (21) and the most updated filtering rule (22). First, the network traffic is filtered at packet/session level (23). From the remaining traffic, objects are reconstructed (24)

Based on the filtering modules rules that are currently defined by Object Filtering Module, this module monitors (based on DPI engine) the live Internet traffic at the learning stage, extract relevant objects and filter out non-monitored object types. The analysis of the objects requires the reconstruction of sessions and extracting the objects at Layer 7 of the communication protocol. Filtering of non-monitored object types can be done at the flow level, i.e., without reconstruction (for example, monitor objects originating from Russia) or, on the object itself after reconstruction and extraction (for example, monitor pdf files)—depending on the type of filtering rule.

According to some embodiments of the present invention the, monitoring and extraction of objects module can be implemented in a memory database where consequent packets with the same source IP address, target IP address, source port, target port are stored together within the same in-memory queue. The reconstruction process consists of ordering the packets according to their sequence number and extracting their payload. Extraction of objects at layer 7 consists of identifying the layer 7 application protocols (e.g. HTTP, FTP, SMTP, etc.) parsing the protocol and extracting objects transferred within the communication.

Figure 5:
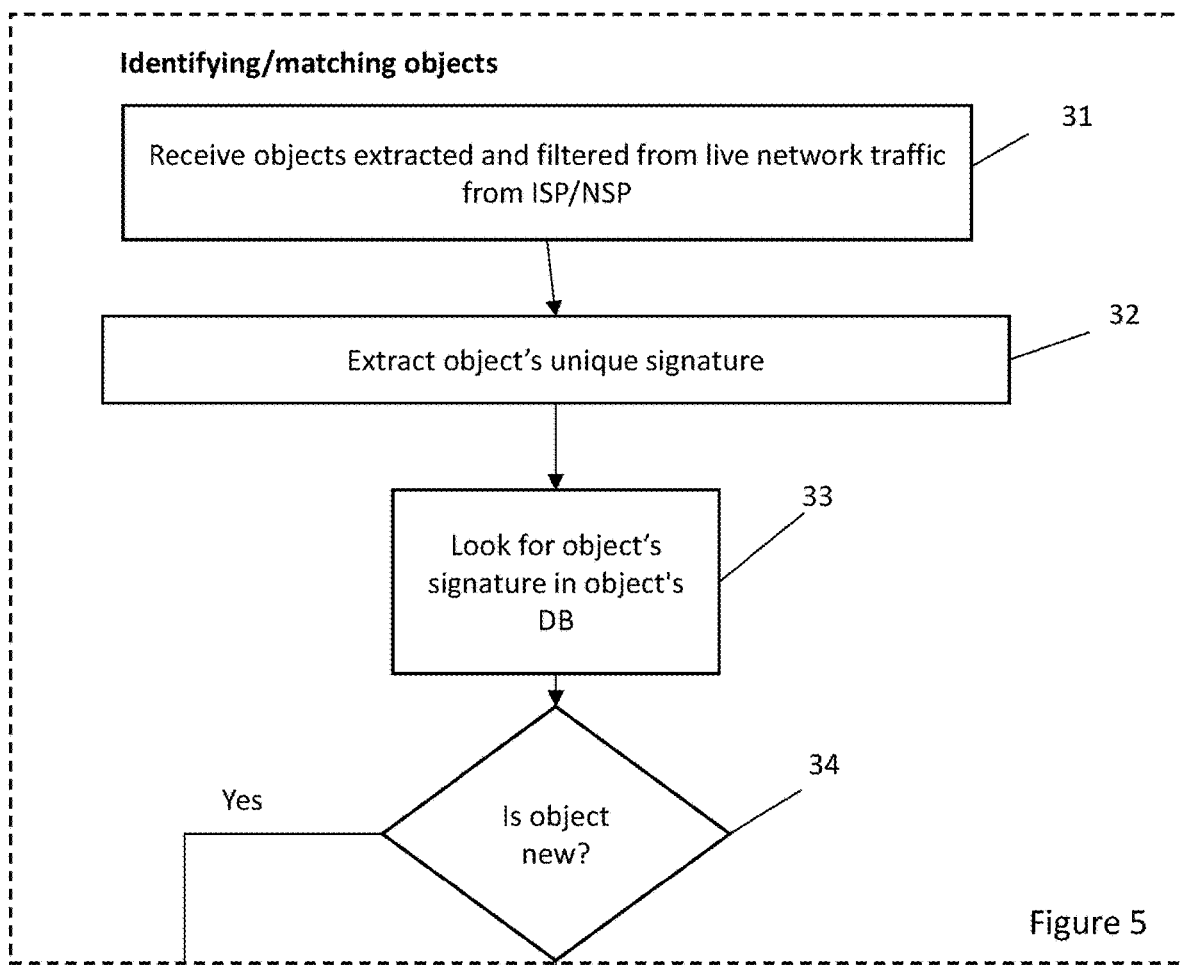
FIG. 5: illustrates a flowchart that represents the process of identifying and matching objects, according to some embodiments of the present invention.

FIG. 5 (see module 210 in FIG. 1A) illustrates a flowchart which represents the process of identifying objects for determining if the object is known or unknown. First, extracted and filtered objects are received (31). For each object a unique signature is extracted (e.g., hash of the object) (32) and the system searches for the similar signatures in the Object's database (33), (e.g., VirusTotal).

If the object is known, we can assign the known label for the object (i.e., malicious or benign).

In the case of a plaintext traffic, simple signature extraction and comparison can be done. If the object is unknown we can apply the detection ML model in order to derive the classification of the object.

In both cases (known or unknown objects) the currently maintained footprint of the object can be updated by the Object Footprint Updater Module in order to analyze the object using all available information.

According to some embodiments of the present invention the object matching and identification module may collected information from external source for identifying known malware or benign objects, such external source can be an Internet service such as VirusTotal, an antivirus software such as McAfee Antivirus, a sandbox Cuckoo, any black or white list of objects, any static or dynamic malware identification system, or any According to some embodiments of the present invention the object matching and identification module may use the object identifiers/signature as suggested by the present invention, such identification may be hash values. In another embodiment the identifiers may be strings or regular expressions that identify the object with high probability.

Figure 6:
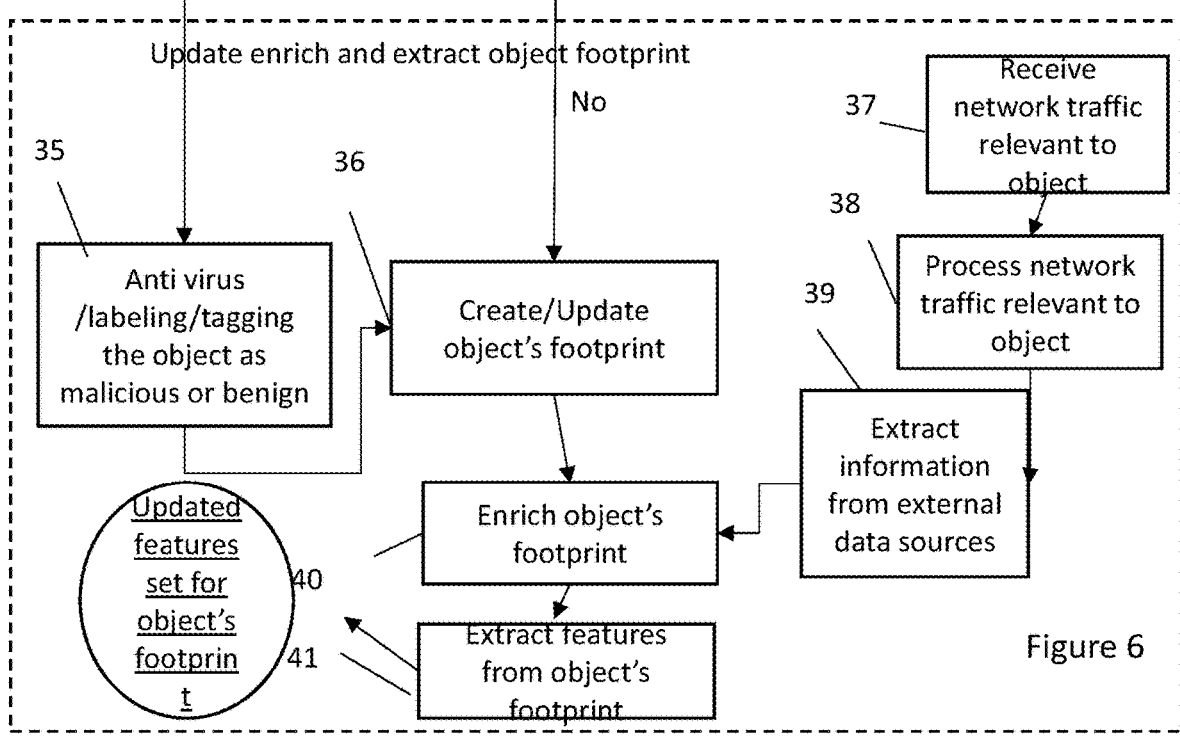
FIG. 6: illustrates a flowchart that represents the process of updating an object's footprint, according to some embodiments of the present invention.

FIG. 6 (see module 216 footprint update FIG. 1B) is a flowchart that presents the process of updating an object's footprint. Based on the identification process of the previous, module, in case the signature was not found in the database (i.e., new Object) (34) then a the object is tagged as malicious or benign using third party security algorithm (35) and new footprint entry for the new Object is created in the database (36). If the signature exists in the database, the system updates the Object's footprint with the new instance (36). Next, network traffic related to the Object is obtained (for example, encrypted traffic related to the source/destination IP of the Object instance) (37). This data is processed and features are extracted (38). Additional features/information are also obtained from external data sources (e.g., Alexa rank for the source/destination IP, geo-location) (39). Using these information, the Object's footprint is enriched with new information (40). Finally, an updated feature vector is computed for the Object's footprint (41).

The footprint update module maintains the footprint of objects (both labeled and unlabeled). This module can operate in an online mode (i.e., for each new instance of the object is updates its footprint) or in a batch mode.

According to some embodiments of the present invention the object footprint may be maintained in a graph database such as Amazon Neptune, Neo4J, OrientDB, etc.

The Object Footprint Updater Module updates all relevant footprint information including the topological structure of the propagation graphs as well as enrichment information.

The enrichment of the footprint can be implemented as an optional plug-in that enriches the footprint graph with available information on nodes and links. Each plugin may be responsible for computing a subset of enrichment features. Such features may include IPs reputation, geo-location, statistics on encrypted traffic (e.g., sent between two nodes before/after the object was exchanged), network traffic behavior, or additional information extracted from IP black lists, Alexa rank, etc.

The footprint embedding/extraction process takes as an input the footprint, i.e. the graph representation, of an object (either known or unknown), including its enrichments. This process transforms the footprint into a vector of values, which can be numeric, nominal, Boolean, or of any other type. This process may be employs using state-of-the-art technique for network embedding. A partial review of the possible techniques can be found in the Network Embedding section.

In a possible embedding of the Footprint Embedding Module the vector representation of a footprint may consist of its diameter, average path length, centralization index, clustering coefficient, and/or any other property of a graph. In addition or instead individual properties of graphs the vector representation of footprint may be derived using various graph embedding techniques available in the literature.

The Footprint Embedding module can be updated at any time with new techniques.

Figure 7:
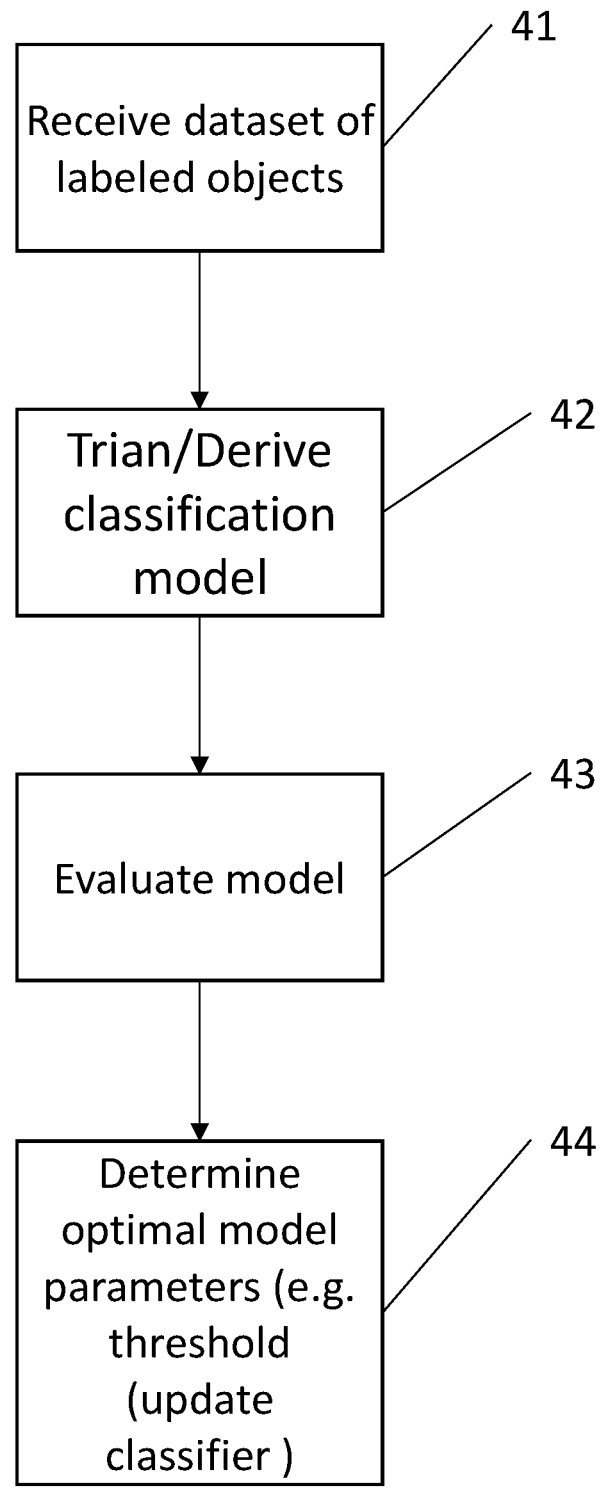
FIG. 7: illustrates a flowchart that describes the process of training a classification model, according to some embodiments of the present invention.

FIG. 7: (see module 222 ML model generator).is illustration of a flowchart that describes the process of training a classification ML model. This process starts with receiving a dataset of labeled footprints (both malicious and benign) (41). Using this dataset, a machine learning model is induced (42). The ML model's performance is evaluated using a test set (43) and the optimal parameter of the model such as the threshold is determined using the evaluation results (44).

The Model Generator module is applied on a labeled set (output of the object matching and identification module) of objects represented by the vector presentation of their footprint (output of footprint embedding module) in order to train/derive a supervised classification model. A feature selection process may be applied in order to reduce dimensionality and improve the accuracy of the model.

According to some embodiments of the present invention the Model Generator Module the classification model can be derived using any supervised classification algorithm such as Random Forest, XGBoost, Deep Neural Network, etc. The configuration parameters for each algorithm are derived using standard hyperparameter optimization processes known in the field of machine learning.

Upon new available labeled data (i.e., footprints of new and known objects) retrain the model.

Optionally, the ML model Generator Module may utilize any state-of-the-art techniques for improving the training process with respect to training speed or the accuracy of the derived model. Standard techniques known in the field which can be utilized to improve the training process include among others, Transfer Learning, Active learning, Semi-supervised learning, etc.

FIG. 8: (see module 224 in FIG. 1*b*) illustrates a flowchart that describes the process of classifying an unknown Object. First, the feature vector representing the unknown object (after extracting from the live network traffic and computing the footprint) is received (51). The trained ML model is applied on the feature vector and the probability of the object being malicious is calculated (52). If the probability is above the defined threshold (53), the object is classified as malicious (55). Otherwise, it is classified as benign.

This malicious footprint detector is applied right after monitoring and extraction of objects module in parallel to object matching and identification module. This embodiment allows continuous online verification of the machine learning models derived by model generator module by comparing the results of the classification by said derived models to classification by external sources used in Object Matching and Identification Module. According to some embodiments of the present invention the malicious footprint detector is applied after Object Matching and Identification Module only on objects that could not be labeled with high confidence using external sources. This embodiment reduces the amount of resources spent on malicious footprint detection.

According to embodiments of the present invention the footprint detector module may be implemented by determining similarity score between objects by comparing their footprints features and determining the type of an object from its similarity to other known objects.

1. Process of Detecting Malicious Objects

The system analyzes objects that are intelligently filtered (selected) from the real network traffic.

Therefore, given the modules described before, the training and detection processes are as follows:

Learning from known objects (attacks and legitimate) includes the following steps:
  a. Detect traffic flows containing the known objects (a file, a script or a link, etc.) In the first stage the objects will be identified using existing signature matching DPI engines.
  b. Generate the network footprint of the known object.
  c. Enrich the footprint graph with available information on nodes and links.
  d. Extract features from the footprint graphs of the known objects.
  e. Train a machine learning classifier based on the labeled dataset from step (d).
  f. Upon new available labeled data (i.e., footprints of new known objects) retrain the model.

Classification of unknown objects and detection on potential new malware includes the following steps:
  g. Identify variety of (suspicious) objects for which we would like to derive the network footprint (based on object filtering module).
  h. Extract unique signature for the identified objects using signatures, eliminate the process of identifying the object, which requires reconstruction of the object.
  i. Note, that this does not mean that the object is tagged as malicious/attack.
  j. Repeat steps (a), (b), (c) and (d) in order to derive the objects' network footprint and its features based on their extracted signatures.
  k. Continuously apply the machine learning classifier (from step (e)) on the objects' identified in step (g) and alert appropriately.
  l. When an object is confirmed to be a malware/attack, its signature (step (h)) is communicated to deployed protection systems.

According to Some Embodiments of the Present Invention it is Suggested to Apply an Additional Analysis for Object Type Detection Using Graph Correlation Algorithm.

This algorithm applied as a second layer of analysis and detection of malicious objects, correlates at least two footprints of monitored objects. This algorithm can be implemented in real time or as a background process.

The graph correlation analysis can be used for:

(1) detecting campaigns: identifying multiple objects that are part of the same campaign (attack)—for example, a script that is sent to end devices followed by an executable that is downloaded to the same end devices once the script is run by the users (or automatically).

(2) classification tuning/overriding: tuning the classification of object for which the footprint classifier was wrong or could not provide a decision with a high confidence.

Let $G(A)$ be the footprint of object A and $G(B)$ be the footprint of object B.

The degree of correlation between the two footprints is based on several features that are extracted from their graphs.

Such features may include:
  the number/percentage of destination IPs in $G(A)$ that appear as the source IPs in $G(B)$
  the number/percentage of destination IPs in $G(B)$ that appear as the source IPs in $G(A)$
  the number/percentage of destination IPs in $G(A)$ that are also appear as the destination IPs in $G(B)$
  the number/percentage of source IPs in $G(A)$ that are also appear as the source IPs in $G(B)$
  the number/percentage of IPs in $G(A)$ (both source and destination) that appear in $G(B)$
  the object A is of type t1 (e.g. Java script) and object B is of type t2 (e.g., executable)
  the number/percentage of flows in $G(A)$ with a timestamp earlier than the first flow in $G(B)$
  the number/percentage of flows in $G(A)$ that appear in parallel (in the same time frame) to flows in $G(B)$
  the distribution of reputation scores of IPs in $G(A)$ and in $G(B)$
  the timespan of $G(A)$ (i.e., the time from the first and last flow in $G(A)$) and $G(B)$ structural features extracted from G(A) and G(B) as defined hereabove.

Once features are extracted, various methods can be applied in order to decide, based on these features, whether there is a correlation between the footprints.

Such methods can be implemented in different methodologies:

1. Rule-based: rules derived by an expert, for example, G(A) and G(B) are correlated if (1) more than 80% of the destination IPs in G(A) are also the source IPs in G(B) and (2) the last flow in G(A) is before the first flow in G(B).

2. Using machine learning classification methods: based on historical data, we can generate a labeled set of correlated and uncorrelated footprints of objects.

By using this dataset, we can train a classifier that based on the features above can classify for two new footprints whether they are correlated or not.

Use Cases

1. Classification of Unknown Software Objects

| Preconditions | A list of signatures of unknown objects is provided Deployed ICDS |
|---|---|
| Post-condition | Every object is assigned the software class |
| Main success scenario | 1. Distribute the signatures to all Intelici ISP sites<br>2. For each one of the unknown objects:<br>3. Collect footprint<br>4. Extract features from footprint and deliver them to the Inelici analysis center<br>5. Continuously classify the collected footprint until sufficient confidence level is reached<br>6. Deliver the classification |

2. Identification of Objects Related to New Exploits

| Pre-conditions | A list of signatures of known, recently published exploits Deployed ICDS |
|---|---|
| Post-condition | List of objects related to the exploits with high confidence of being malicious |
| Main success scenario | 1. Distribute the signatures to all Intelici ISP sites<br>2. For each one of the exploits:<br>3. Collect footprint<br>4. Identify related objects<br>  a. Collect incoming outgoing traffic of endpoints of flows containing the exploit<br>  b. Identify common objects contained in the flows<br>  c. Identify similar flows and define them as objects<br>5. Generate signatures for related objects<br>6. Collect footprint of related objects<br>7. Create a unified footprint of exploit and related objects<br>8. Extract features from the unified footprint and deliver them to the Inelici analysis center<br>9. Continuously classify the collected footprint until sufficient confidence level is reached<br>10. Deliver the footprint of exploits<br>11. Deliver related objects and their classifications |

3. Identification of New Suspicious Objects

| Pre-conditions | Filtering criteria Deployed ICDS |
|---|---|
| Post-condition | List of objects related to the exploits with high confidence of being malicious |
| Main success scenario | 1. Collect traffic flows matching the filtering criteria<br>2. Identify objects for footprint collection<br>  a. Identify common objects contained in the flows or<br>  b. Identify similar flows and define them as objects<br>3. Generate signatures for identified objects<br>4. Distribute the signatures to all Intelici ISP sites<br>5. For each one of the identified objects:<br>6. Collect footprint<br>7. Extract features from footprint and deliver them to the Inelici analysis center<br>8. Continuously classify the collected footprint until sufficient confidence level is reached<br>9. Deliver the classification<br>10. Stop tracking footprint classified objects |

Deployment

One possible embodiment may use the ISP DPI to reduce complexity and cost

Intelici can support ISP with existing DPI as long it support the verity of the classification and capacity needed for our engine, below we add 2 charts the describes 2 type of ISP topology that our solution support and integrated to:

1. Traditional ISP topology that less flexible but can support our system.
2. New topology based on data Chaining (NFV) that can ease the integration and reduce cost.

Examples of Attacks

| Domain stealing attacks | |
|---|---|
| Attack Purpose: | Pharming; Establishing botnet; |
| Attack execution flow: | 1. Attacker sets up a system mocking the one trusted by the users.<br>2. The attacker then poisons the resolver for the targeted site. This is achieved by DNS poisoning/spoofing, DNS hijacking, or Domain hijacking.<br>3. When the victim requests the URL for the site, the poisoned records direct the victim to the attackers' system rather than the original one.<br>4. The attacker is able to farm sensitive information usually provided to the original website or can exploit vulnerabilities in the victim browser to subvert the victim's system. |
| Assumptions: | 1. Attack stage 2 is undetected.<br>2. Attacker sets up the rogue clone of trusted website on unpopular IP address. |
| Detection method: | 1. Pick up new or unpopular IP addresses that receive many requests.<br>2. Search for A records containing the respective IPs - evidence 1<br>3. Perform reverse DNS lookup for the respective IPs - evidence 2<br>4. Perform DNS lookup for the respective domain names in disperse geographical locations - evidence 3<br>5. In case of failure in step 4 or collision between evidence 2 and evidences 1 or 3 - alert |
| False positive rate: | Negligible; (low in case of Domain hijacking) |
| Benefit of deployment at the ISP level: | It is not reasonable to perform reverse DNS queries for each and every IP address accessed by the user. Only NSP level monitoring enables execution of step 1 (detection method) thus significantly reducing the number of DNS queries required to validate the attack. |
| Challenges: | When there is lots of variance in traffic e.g. boost during holidays the false rate at step 1 will be extremely high. This is when the real attackers will strike. |
| Specific example: | |

| | Server-bot recruitment |
|---|---|
| Attack Purpose: | Establishing botnet; Stealing information; |
| Attack execution flow: | 1. Attacker exploits a critical vulnerability on large class of servers (web, search, FTP, . . . )<br>2. After getting code execution privilege attacker downloads a dropper and/or a rootkit.<br>3. Subverted server listens for C&C commands. |
| Assumptions: | 1. C&C goes undetected.<br>2. Exploit and dropper are transmitted in clear text.<br>3. ICDS collects footprint of the original exploit and of the dropper. |
| Detection method: | 1. Mark traffic flows by EITHER<br>  a. Obtaining sample of the exploit and log all its occurrences; OR<br>  b. Logging all requests made to victim servers and cluster them by similarity (every cluster is marked separately as a potential exploit); OR<br>  c. Logging all abnormal flows directed toward made toward the victim servers;<br>2. Log the few downloads made by victim servers.<br>3. Find downloads made after receiving the marked traffic - evidence 1<br>4. Alert in case that a download is suspicious according to evidence 1 in many cases. |
| False positive rate: | Medium; |
| Benefit of deployment at the ISP level: | Only NSP level monitoring enables correlating downloads made by a set of servers with traffic flows the servers received prior to the download. |
| Challenges: | In case of detection method 1.a, big-data framework is required to make the correlations.<br>In case of detection method 1.c, traffic anomaly detection should be performed on many sampled flows in real time. |
| Specific example: | The Elastic Botnet http://www.novetta.com/wp-content/uploads/2015/06/NTRG ElasticBotnetReport 06102015.pdf |

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

REFERENCES

[1] Bebber, D. P., Hynes, J., Darrah, P. R., Boddy, L.,& Fricker, M. D. (2007). Biological solutions to transport network design. Proceedings of the Royal Society of London B: Biological Sciences, 274(1623), 2307-2315.

[2] Newman, M. Networks: An Introduction (Oxford University Press, Oxford, 2009)

[3] D. Conte, P. Foggia, C. Sansone, and M. Vento. Thirty years of graph matching in pattern recognition. Int. Journal of Pattern Recognition and Artificial Intelligence, 18(3):265-298, 2004.

[4] Foggia, P., Percannella, G., & Vento, M. (2014). Graph matching and learning in pattern recognition in the last 10 years. International Journal of Pattern Recognition and Artificial Intelligence, 28(01), 1450001.

[5] Riesen, K., & Bunke, H. (2010). Graph classification and clustering based on vector space embedding. World Scientific Publishing Co., Inc.

[6] A. Shrivastava and P. Li. A new space for comparing graphs. In Advances in Social Networks Analysis and Mining (ASONAM), 2014 IEEE/ACM International Conference on, pages 62-71. IEEE, 2014.

[7] Estrada, E. (2011) The Structure of Complex Networks: Theory and Applications. Oxford University Press, Oxford, U.K.

[8] Leskovec, J., Chakrabarti, D., Kleinberg, J., Faloutsos, C., Ghahramani, Z.: Kronecker graphs: an approach to modeling networks. Journal of Machine Learning Research. 11, 985-1042 (2010)

[9] Yaveroğlu, Ö. N., Milenković, T., Pržulj, N. (2015). Proper evaluation of alignment-free network comparison methods. Bioinformatics, 31(16), 2697-2704.

[10] Michael Fire, Lena Tenenboim-Chekina, Ofrit Lesser, Rami Puzis, Lior Rokach, Yuval Elovici, "Computationally Efficient Link Prediction in Variety of Social Networks", ACM Transactions on Intelligent Systems and Technology, 5(1): (2013)

[11] KATZ, L. 1953. A new status index derived from sociometric analysis. Psychometrika 18, 1, 39-43.

[12] Liben-Nowell, David, and Jon Kleinberg. "The link-prediction problem for social networks." Journal of the American society for information science and technology 58.7 (2007): 1019-1031.

[13] Berlingerio, M., Koutra, D., Eliassi-Rad, T., & Faloutsos, C. (2012). NetSimile: a scalable approach to size-independent network similarity. arXiv preprint arXiv: 1209.2684.

[14] Aliakbary, Sadegh, Sadegh Motallebi, Sina Rashidian, Jafar Habibi, and Ali Movaghar. "Distance metric learning for complex networks: Towards size-independent comparison of network structures." Chaos: An Interdisciplinary Journal of Nonlinear Science 25, no. 2 (2015): 023111.

[15] Pržulj, Natasa: Biological network comparison using graphlet degree distribution. Bioinformatics 23(2), e177-e183 (2007)

[16] Kuramochi, M., & Karypis, G. (2001). Frequent subgraph discovery. In Data Mining, 2001. ICDM 2001, Proceedings IEEE International Conference on (pp. 313-320). IEEE.

[17] Milo, R., et al.: Network motifs: simple building blocks of complex networks. Science 298, 824827 (2002)

[18] Gómez-Gardenes, J., Reinares, I., Arenas, A., & Floría, L. M. (2012). Evolution of cooperation in multiplex networks. Scientific Reports, 2.

[19] Menichetti, G., Remondini, D., Panzarasa, P., Mondragón, R. J., & Bianconi, G. (2014). Weighted multiplex networks. PloS One, 9(6), e97857.

[20] Rami Puzis, Yedidya Bar-Zev, Arik Vartanian, "Graph Classification using Information-Gain Feature Ranking" NetSci, Berkeley, Calif., US, 2014.

[21] Riesen, K., Neuhaus, M., & Bunke, H. (2007, June). Graph embedding in vector spaces by means of prototype selection. In International Workshop on Graph-Based Representations in Pattern Recognition (pp. 383-393). Springer Berlin Heidelberg.

[22] Hisashi Kashima, Koji Tsuda, and Akihiro Inokuchi. Marginalized kernels between labeled graphs. In International Conference on Machine Learning, volume 20, page 321, 2003.

[23] Karsten M. Borgwardt and Hans-Peter Kriegel. Shortest-path kernels on graphs. In Data Mining, Fifth IEEE International Conference on. IEEE, 2005.

[24] Pierre Mahe and Jean-Philippe Vert. Graph kernels based on tree patterns for molecules. Machine Learning, 75(1):3-35, 2009.

[25] Michel Neuhaus, Kaspar Riesen, and Horst Bunke. Novel kernels for error-tolerant graph classification. Spatial Vision, 22(5):425-441, 2009.

[26] Nino Shervashidze, Tobias Petri, Kurt Mehlhorn, Karsten M. Borgwardt, and S. V. N. Viswanathan. Efficient graphlet kernels for large graph comparison. In International Conference on Artificial Intelligence and Statistics, pages 488-495, 2009.

[27] E. Pekalska and R. Duin. The Dissimilarity Representation for Pattern Recognition: Foundations and Applications. World Scientific, 2005.

[28] Airoldi, E. M., Blei, D. M., Fienberg, S. E., Xing, E. P.: Mixed membership stochastic blockmodels. In: Advances in Neural Information Processing Systems, pp. 33-40 (2009)

[29] Myunghwan, K., Leskovec, J.: Multiplicative attribute graph model of real-world networks. Internet Math. 8(1-2), 113-160 (2012)

[30] Davis, M., Liu, W., Miller, P., Hunter, R. F.,Kee, F.: AGWAN: A Generative Model for Labelled, Weighted Graphs. In: New Frontiers in Mining Complex Patterns, pp. 181-200. Springer International Publishing (2014)

[31] Kim, M., Leskovec, J.: The network completion problem: inferring missing nodes and edges in networks. In: SDM, pp. 47-58 (2011)

[32] Sukrit, G., Rami, P., & Konstantin, K. (2016). Comparative Network Analysis Using KronFit. In Complex Networks VII (pp. 363-375). Springer International Publishing.

[33] Suganthan, P. N., Teoh, E. K., & Mital, D. P. (1995). Pattern recognition by homomorphic graph matching using Hopfield neural networks. Image and Vision Computing, 13(1), 45-60.

[34] Hopfield, J J 'Neurons with graded response have collective computational properties like those of two-stage neurons', Proceedings of the National Academy of Sciences, Vol 81 (1984) pp 3088-3092

[35] Perozzi, B., Al-Rfou, R., & Skiena, S. (2014, August). Deepwalk: Online learning of social representations. In Proceedings of the 20th ACM SIGKDD International Conference on Knowledge Discovery and Data Mining (pp. 701-710). ACM.

[36] Mikolov, T., & Dean, J. (2013). Distributed representations of words and phrases and their compositionality. Advances in Neural Information Processing Systems.

[37] Yanardag, P., & Vishwanathan, S. V. N. (2015, August). Deep graph kernels. In Proceedings of the 21th ACM SIGKDD International Conference on Knowledge Discovery and Data Mining (pp. 1365-1374). ACM.

[38] Micheli, A. (2009). Neural network for graphs: A contextual constructive approach. IEEE Transactions on Neural Networks, 20(3), 498-511.

[39] Niepert, M., Ahmed, M., & Kutzkov, K. (2016). Learning Convolutional Neural Networks for Graphs. arXiv preprint arXiv:1605.05273.

[40] McKay, Brendan D. and Piperno, Adolfo. Practical graph isomorphism, {II}. Journal of Symbolic Computation 60(0):94-112, 2014.

[41] Clark, C., & Kalita, J. (2014). A comparison of algorithms for the pairwise alignment of biological networks. Bioinformatics, 30(16), 2351-2359.

The invention claimed is:

1. A method for determining a type of an object distributed through a communication network said method implemented by one or more processing devices operatively coupled to a non-transitory storage device, on which are stored modules of instruction code that when executed cause the one or more processing devices to perform:

monitoring traffic containing unknown objects through the communication network, wherein the unknown objects are digital objects whose classification as malicious or benign are not determined yet;

for each of the unknown objects, building the unknown object's footprint, wherein said footprint is inferred from monitored traffic flows that contain said unknown object wherein the footprint is organized in a graph structure wherein nodes are source and target network addresses of said traffic flows and wherein two nodes are connected when there is a traffic flow between the network address of the respective nodes containing the said unknown object;

analyzing the unknown object's footprint for identifying features or characteristics or parameters of the footprint and classifying the unknown object's type as malicious or as legitimate or benign.

2. The method of claim 1 further comprising correlating at least two footprints of monitored unknown objects, wherein the degree of correlation between the two footprints is based on several features that are extracted from their graphs.

3. The method of claim 1 wherein the building the footprint of the unknown object is a continuous process in which the footprint can be updated when new instances of the specific object are observed within the traffic.

4. The method in claim 1 wherein the unknown object identity is determined by a signature, wherein the signature is generated from the digital properties of the unknown object.

5. The method of claim 4 further comprising identifying an unknown object based on object signature by comparing to a database of known objects signatures.

6. The method of claim 4 further comprising attempting to identify an unknown object based on object signature by comparing to a database of known objects signatures, and when the unknown object is not identified tagging the unknown object based on external security analysis of the unknown object.

7. The method of claim 1 wherein the footprint graph is enriched with additional information of data related to object communication environment or characteristic.

8. The method of claim 1 wherein the footprint analysis includes transforming footprints into numeric vectors, building a classifier machine learning model for discriminating between types of unknown objects based on said numeric vectors, using the said classifier to determine type of an unknown object based on said numeric vectors.

9. The method of claim 1 where the analysis includes determining similarity score between unknown objects by comparing their footprints features determining the type of an unknown object from its similarity to other objects.

10. The method of claim 1 further comprising filtering the monitored unknown objects based on ongoing filtering rules determined based on analyzing internal and external data related to said unknown objects.

11. The method of claim 10 wherein the footprint contains additional enrichment information about the nodes (sources or targets) of traffic flows.

12. A system for determining a type of an object distributed through a communication network, said system comprising a non-transitory storage device and one or more processing devices operatively coupled to the storage device on which are stored modules of instruction code executable by the one or more processors, the stored modules comprising:

taping module monitoring traffic containing unknown objects through the communication network, wherein the unknown objects are digital objects whose classification as malicious or benign are not determined yet;

footprint update module for building a footprint for each of the unknown objects, wherein said footprint is inferred from monitoring traffic flows that contain said unknown object;

wherein the footprint is organized in a graph structure wherein nodes are source and target network addresses of said traffic flows and wherein two nodes are connected when there is a traffic flow between the network address of the respective nodes containing the said unknown object;

detection module for analyzing the unknown object's footprint for identifying feature or characteristics or parameters of the footprint to classify the unknown object's type as malicious or as legitimate or benign.

13. The system of claim 12 wherein the detection module is implemented at an ISP provider infrastructure.

14. The system of claim 12 wherein the unknown object identity is determined by a signature, wherein the signature is generated from the digital properties of the unknown object.

15. The system of claim 12 wherein the footprint graph is enriched with additional information of data related to object communication environment or characteristic.

16. The system of claim 12 wherein the footprint contains additional enrichment information about the nodes (sources or targets) of traffic flows.

17. The system of claim 12 wherein footprint analysis includes transforming footprints into numeric vectors, building a classifier machine learning model for discriminating between types of unknown objects based on said numeric vectors, using the said classifier to determine type of an unknown object based on said numeric vectors.

18. The system of claim 12 wherein the analysis includes determining similarity score between unknown objects by comparing their footprints features, determining the type of an unknown object from its similarity to other objects.

19. The system of claim 12 further comprising a matching module for identifying an unknown object based on object signature by comparing to a database of known objects signatures.

* * * * *